United States Patent [19]

Korn

[11] 3,918,087

[45] Nov. 4, 1975

[54] TWO CHANNEL AND FOUR CHANNEL, EIGHT TRACK TAPE PLAYER

[75] Inventor: Hugo Korn, Chicago, Ill.

[73] Assignee: Motorola, Inc., Chicago, Ill.

[22] Filed: Nov. 29, 1971

[21] Appl. No.: 203,075

Related U.S. Application Data

[63] Continuation of Ser. No. 19,927, March 16, 1970.

[52] U.S. Cl. ...................... 360/61; 360/94; 360/106

[51] Int. Cl.$^2$ .................... G11B 15/12; G11B 5/008; G11B 5/55

[58] Field of Search ........ 179/100.22 MD; 328/154; 360/61, 94, 106

[56] References Cited

UNITED STATES PATENTS

| | | | |
|---|---|---|---|
| 2,468,198 | 4/1949 | Heller | 179/100.2 MD |
| 3,280,348 | 10/1966 | Jensen | 328/154 |
| 3,426,338 | 2/1969 | Gerding | 179/100.2 MD |
| 3,507,501 | 4/1970 | Lear | 179/100.2 Z |

*Primary Examiner*—Vincent P. Canney
*Assistant Examiner*—Jay P. Lucas
*Attorney, Agent, or Firm*—James W. Gillman; Donald J. Lisa

[57] ABSTRACT

A multi-track cartridge type tape player is provided with means for sensing the type of cartridge inserted therein as a result of a physical identification characteristic of the cartridge so that the tape player can receive and play interchangeably either cartridges having eight tracks divided into two programs of four channels in each program or eight tracks having four programs with two channels per program. A two level cam engages a cam follower on the magnetic tape head to move the head between two positions, and a cam switch rotates with the cam and activates appropriate transducer portions of the head to selectively play four channels of the eight track tape or two channels of the eight track tape without manual adjustment.

3 Claims, 10 Drawing Figures

Inventor
HUGO KORN
BY
Mueller, Aichele & Rauner
ATTYS.

Inventor
HUGO KORN
BY
Mueller, Aichele, & Rauner
ATTYS.

TWO CHANNEL AND FOUR CHANNEL, EIGHT TRACK TAPE PLAYER

This is a continuation of application Ser. No. 19,927, filed Mar. 16, 1970.

BACKGROUND OF THE INVENTION

This invention relates generally to multi-track magnetic tape players, and more particularly to cartridge type multi-track tape players which receive self-contained cartridges of magnetic tape having prerecorded audio signal information thereon.

Multi-track magnetic tape players of the four track and eight track type are well known in the art for reproducing either monaural or stereophonic sound, whichever the case may be, for the listening pleasure of the user thereof. Such tape players have found relative popularity in automobiles because of the ease with which a cartridge can be inserted into the tape player, a feature which lends this type of tape player readily to the safe operation of the motor vehicle, for instance, by the driver while he uses the player. Cartridge type tape players of this type generally include switch means which instantly actuate the tape reproducing mechanisms upon complete insertion of a cartridge into the tape player. To turn off the tape player, the operator merely pulls out the cartridge, either partially or all the way.

The listening quality of the stereophonic sound reproduced on corresponding pairs of channels or tracks on an eight track tape has increased the listening pleasure of musical recordings as compared to similar recordings on monaural sound tracks. Although stereophonic sound (two channels of sound) increase the listening pleasure, it is observed that three, four or more channels of independent sound will further increase the listening pleasure since it will more readily simulate the effect of a large orchestra hall as well as allow independent reproduction of the sounds of different musical instruments. Although the effect of more than the two channels of sound will increase the listening pleasure of musical recordings, it has been heretofore impractical, and very expensive to reproduce such multi-channel sounds from a magnetic tape. For example, when a four channel sound system is used, four separate transducer portions on a magnetic head are required. However, if these transducer portions are located sufficiently close to one another, undesirable cross channel coupling may occur to decrease the fidelity of the sound ultimately reproduced. Another problem, particularly from an economic standpoint of the user, is that the large number of pre-existing cartridges of prerecorded stereophonic music is not readily compatible for reproduction in four channel eight track sound systems.

SUMMARY OF THE INVENTION

Accordingly, it is an object of this invention to provide a multi-track tape player which can interchangeably accept cartridges having four programs of two channels per program on an eight track tape, or cartridges having two programs having four channels per program on an eight track tape.

Another object of this invention is to provide a multi-track tape player including automatic identification means which identifies the cartridge inserted therein as either a two channel or four channel tape to automatically actuate the appropriate reproducing portions of a magnetic head.

Yet another object of this invention is to provide a four channel sound system for an automobile wherein sound will emanate from four speakers within the interior of the automobile, each speaker reproducing the sound of a given independent channel, and the four speakers will be connected in pairs to reproduce stereophonic sound therefrom when a stereophonic tape cartridge is inserted into the tape player.

A feature of this invention is the use of a two level cam and associated cam switch to select appropriate transducer portions of the tape head to play either two channel or four channel eight track cartridges without manual adjustment to accommodate for the different types of cartridges inserted into the tape player.

Briefly, the multi-track tape player of this invention includes a magnetic tape head which has four transducer portions formed thereon to be in alignment with four distinct tracks of an eight track tape. Depending on the identification characteristic of the cartridge either four channels of audio information or two channels of audio information will be reproduced automatically. When the tape player is used in an automobile, the four speakers of the system are placed respectively in the four corners of the interior of the automobile, for example, one speaker at the front right, one at the front left, one at the rear right and one at the rear left of the interior to surround the occupants thereof with four channels of sound. To balance the sound level emanating from each speaker, independent balance controls are provided for each of the four channels to simulate a centering condition of the sound similar to that of left and right balancing on a stereophonic sound system. Once the four channels are balanced as desired, a single volume control then allows simultaneous uniform increase and decrease of the volume so that each channel tracks the other upon manipulation of a single control knob or volume control.

To distinguish the four channel eight track cartridge from a two channel eight track cartridge, a notch is provided in the four channel eight track cartridge and serves as an identification characteristic which automatically sets up the tape player to reproduce the sound on the tape according to the type of cartridge inserted therein. To this end, a cam is provided with a plurality of cam surfaces alternately varying between two cam levels so as to index the tape head between first and second positions. Associated with the cam is a rotary switch selectively connected to certain ones of the channels of the four channel audio system to enable and disable these channels according to the position of the switch, which, in turn, corresponds to the position of the cam. By this arrangement, a magnetic head having four transducer portions and movable between first and second positions can simulate movement between four positions as is the case in conventional two channel four track tape players presently available. This feature allows conventional two channel, eight track cartridges to be inserted and played in the four channel, eight track tape player without any precaution or manipulation on the part of the user except merely inserting the cartridge into the tape player. The identification and selection is done automatically as a result of the identification notch, or other identification means formed on the cartridge to actuate a sensing switch means or the like on the tape player.

DESCRIPTION OF THE PREFERRED EMBODIMENT

Figure 1:
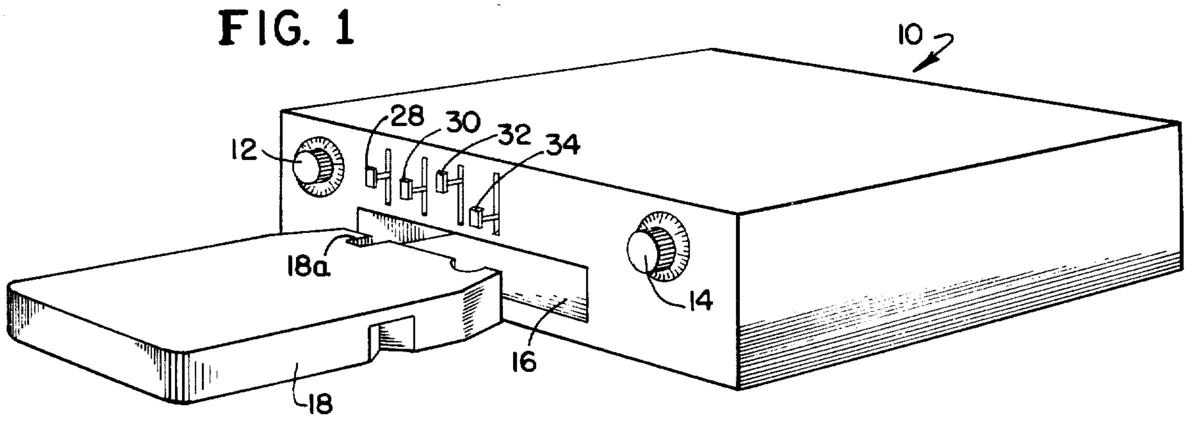
FIG. 1 is a diagramatic representation of a four channel, eight track tape player of this invention.
Figure 2:
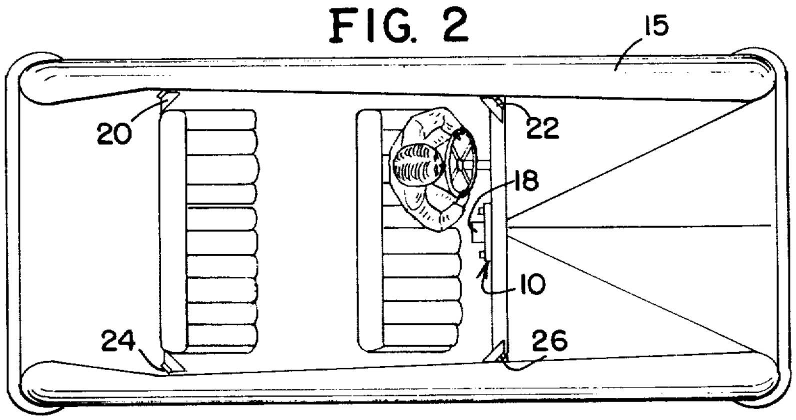
FIG. 2 is a top plan view illustrating an automobile with four speakers in the four quadrants of its interior illustrating one use of the tape player of this invention.

Referring now to FIG. 1, there is seen a diagrammatic representation of a multi-track magnetic tape player designated generally by reference numeral 10. The tape player 10 may include any suitable mounting brackets to permit mounting the player to the interior of an automobile, as seen in FIG. 2, in a convenient location to be used by the operator of the automobile. In a conventional manner, the tape player 10 may include a tone control 12 and a volume control 14. An entry way 16 is provided to receive a cartridge 18 such that the insertion of the cartridge 18 into the player 10 will cause automatic turn on of the same, and removal of the cartridge 18, at least to an unlocked condition, will cause automatic turn off of the tape player 10. The cartridge 18 may be one of at least two characteristic types, each type being identified by identification characteristics on the cartridge. For example, the cartridge 18 may house eight track magnetic tape wherein two tracks are utilized per recorded program to simulate the two channels of stereophonic sound. This is the conventional method of recording information on eight track stereo tape. However, the cartridge 18 may contain an eight track tape wherein two programs are recorded and each program contains four independent channels of audio information. When the cartridge is of this latter type, it is identified by a notch 18a. However, it will be understood that any suitable identification means may be used on the cartridge 18 either a notch, an aperture, printed indicia, or a physical characteristic of the cartridge such as size or shape.

Most advantageously, when the tape player 10 is used to reproduce four channels of audio information for each recorded program, the sound is reproduced independently from four speakers 20, 22, 24 and 26 located in the four corners of the automobile 15, FIG. 2, substantially to simulate surrounding the operator of the automobile with music. FIG. 2 illustrates the automobile 15 as having the top thereof removed to more clearly illustrate the location and arrangement of the speakers therein, it being understood that the automobile may be a sedan, hardtop or convertible, as desired, and the four speakers may be located in positions other than those shown in FIG. 2.

Preferably, independennt balance controls 28, 30, 32 and 34 extend from the front surface of the tape player 10 to be in easy reach of the operator of the automobile 15 so that the relative volume of sound from each of the speakers in the four corners of the automobile can be adjusted to a substantially balanced condition, thereby simulating centering the operator of the automobile to the musical center of the air space defined by the interior of the automobile.

Figures 3, 6, 7, 8, 9, 10:
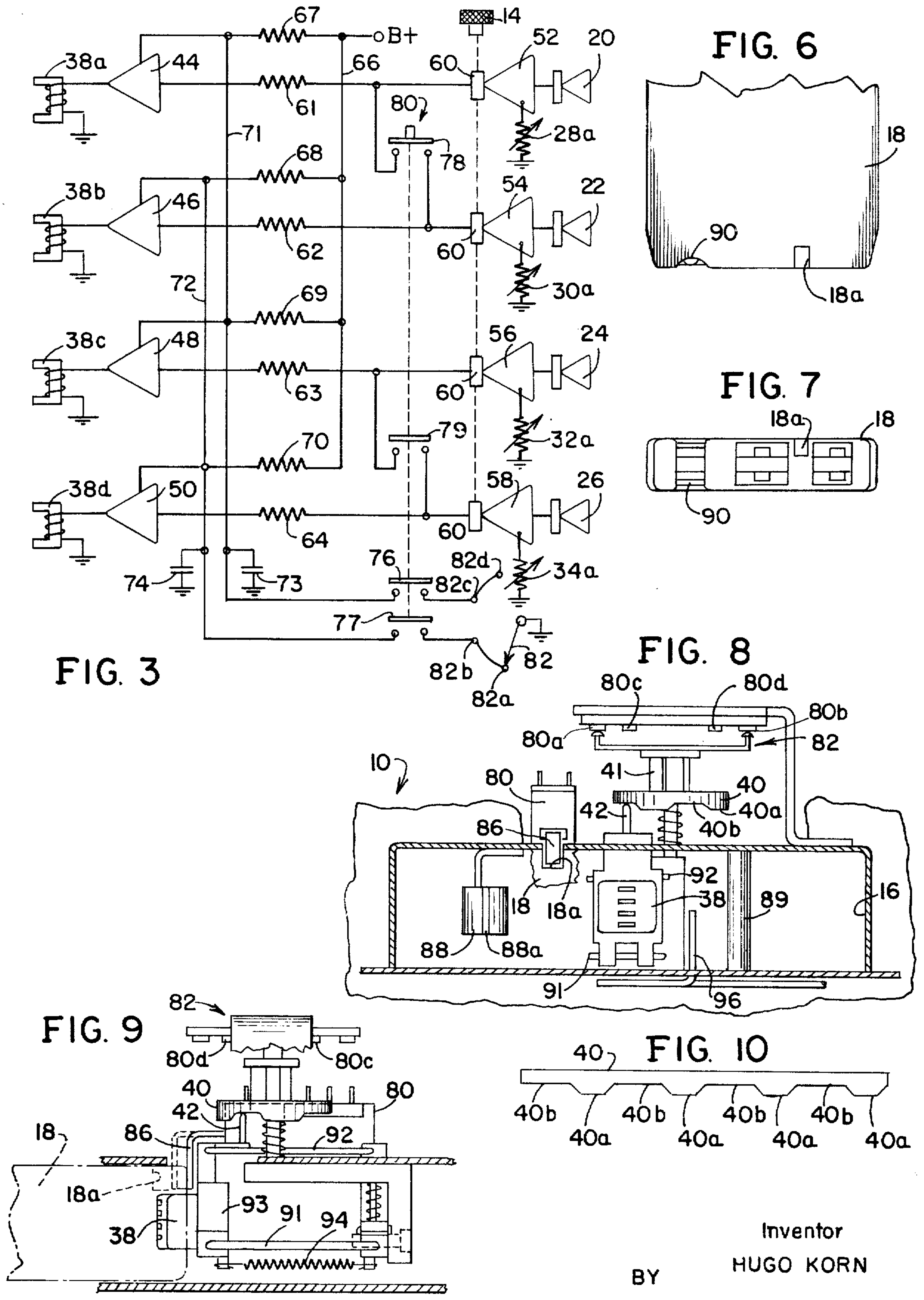
FIG. 3 is a simplified schematic diagram of the electrical circuitry of the tape player of FIG. 1.
FIG. 6 is a fragmentary top view of a portion of a cartridge which has an identifying notch formed thereon to indicate that the cartridge is of the four channel, eight track type.
FIG. 7 is a front view of the cartridge of the FIG. 6.
FIG. 8 is an enlarged fragmentary partially sectional view of the entry way of the tape player of FIG. 1 illustrating the magnetic head therein as well as a sensing switch actuator which automatically switches the tape player between two channel and four channel operation.
FIG. 9 is a fragmentary, partially sectional side view of a portion of the tape player of FIG. 1 illustrating the switch actuator in phantom line when it fits into the notch of the cartridge and in a depressed condition to actuate a switch when actuated by a structural portion of the cartridge not having a notch.
FIG. 10 illustrates an extended planar view of the periphery of the cam used to actuate the magnetic tape head between its two positions.

The tape player 10 is equipped to receive cartridges 18 of either the eight track, two channel or eight track, four channel types without adding an extra burden of manipulation on the operator of the automobile, as means are provided within the tape player 10 to automatically switch the various circuit components thereof upon inserting a cartridge of a given characteristic. This is best illustrated in FIGS. 6 and 7 wherein the cartridge 18 is shown with the notch 18a formed at the front end thereof which not only identifies the cartridge as one of the type having eight tracks with four channels of recorded information per program, but also provides means for automatic switching of the tape player 10 to operate the player 10 either as a two channel or four channel player. Except for the notch 18a on the cartridge 18, the cartridge is of standard configuration and design of the type which contain tapes having four programs of two channel sound.

Figure 4:
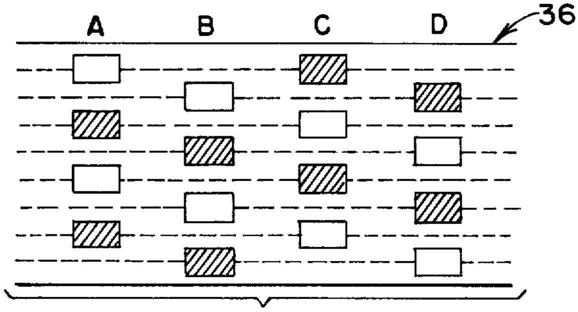
FIG. 4 illustrates the eight track, two channel manipulation of the four transducer portions on the tape head of this invention.
Figure 5:
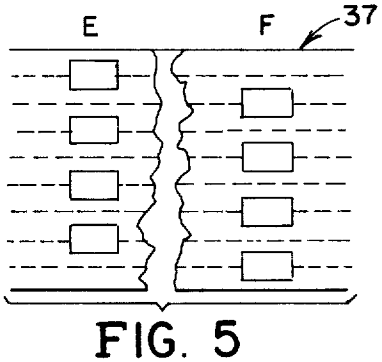
FIG. 5 illustrates the four channels on a pair of programs formed on a magnetic tape.

FIGS. 4 and 5 illustrate eight track tape which can be housed in the different cartridges to be inserted into the tape player 10. In FIG. 4, the eight track tape is of the two channel type and is designated by reference numeral 36, and in FIG. 5 the eight track tape is of the four channel type and is designated by reference numeral 37. The tapes 36 and 37 come in contact with a magnetic tape head 38 having four transducer portions formed thereon as indicated in FIGS. 8 and 9, and each transducer portion is indicated by the vertically spaced apart rectangles on the tapes 36 and 37. The four transducer head 38 is shiftable between two positions by means of a cam 40 which has alternate cam surfaces 40a and 40b, one following the other, as clearly illustrated by the extended peripheral configuration of the cam 40 in FIG. 10. The cam surfaces 40a and 40b engage a cam follower 42 which is secured to the magnetic head 38 to cause movement of the head in response to rotation of the cam 40.

Again referring to FIG. 4, the four vertical rectangular areas represent the active areas of each of the four transducer portions of the magnetic head 38. However, tape 36 is a conventional stereophonic eight track tape wherein only two channels or tracks are used for a given program, and there are provided four programs A, B, C and D. Therefore, means are provided to disable two of the reproducing portions of the four transducer magnetic head when playing tapes of this type.

Generally, when a conventional two transducer head is used with tapes of this type, the head is shifted to four different positions to reproduce the four different programs recorded on the eight track tape. However, here it is proposed that a combination of positioning and switching devices be utilized to simulate the effect of actually moving the head through four physical positions while in reality the head is only shifted between two programs and electrically switched between the remaining two programs. The solid rectangles of FIG. 4 indicate those transducer portions that are active and the shaded rectangles indicate those transducer portions that are inactive.

When an eight track, four channel tape is inserted into the tape player 10, all four heads are automatically energized, as indicated diagrammatically by the solid rectangles in FIG. 5, to reproduce simultaneously the four channels of a given program E and then, upon completion of such reproduction, the head is automatically shifted to its next position to reproduce the four channels of the other recorded program F.

Referring now to FIG. 3, there is seen a simplified schematic diagram of the electronic components forming the eight track, four channel tape player 10. Here the four transducer portions of the magnetic head 38 are indicated by reference numerals 38*a*, 38*b*, 38*c* and 38*d*. An independent preamplifier circuit 44, 46, 48 and 50 is connected to the transducer portions 38*a*, 38*b*, 38*c* and 38*d*, respectively, to amplify the audio signal information developed at the transducer portions and apply this signal information to audio power amplifier circuits 52, 54, 56 and 58, respectively. The output of the audio power amplifiers is then applied to the speakers 20, 22, 24 and 26, respectively, to reproduce the sound in a manner to substantially surround the operator of the automobile 15 with sound as though he were in the middle of an orchestra. Each of the power amplifier circuits is provided with variable resistance elements 28*a*, 30*a*, 32*a* and 34*a*, to provide balance control means to balance the audio volume of the speakers with respect to each other, these variable resistors being connected to the slide levers 28, 30, 32 and 34, respectively, at the front panel of the player 10, as seen in FIG. 1.

Volume control means 60 is provided at the input of each of the audio power amplifiers and ganged together by suitable means to be controlled by the single control knob 14. Therefore, once the relative balance of volume between each of the channels is obtained by the resistors 28*a*, 30*a*, 32*a* and 34*a*, simultaneous tracking of volume is obtained by the single control means 60.

The output of each of the preamplifiers 44, 46, 48 and 50 is coupled to the respective power amplifier through resistance elements 61, 62, 63 and 64, respectively, and power is applied to each of the preamplifier circuits through a B+ line 66 and respective resistors 67, 68, 69 and 70. The power input to preamplifiers 44 and 48 are tied together by a line 71 and are rendered operative and inoperative together during one mode of operation while the power input to preamplifiers 46 and 50 are tied together by a line 72 and are rendered operative and inoperative together during the said one mode of operation but at different times during this mode of operation. Lines 71 and 72 may be provided with noise filter capacitors 73 and 74, respectively. Lines 71 and 72 are selectively coupled to ground potential through contactors 76 and 77, respectively, of an identification switching device or mode switch 80. The mode switch 80 is actuated in response to the identification characteristic information formed on the cartridge 18, here it being the notch 18*a* which prevents actuation of the mode switch 80 while the absence of the notch causes actuation of the mode switch 80. Also associated with the mode switch 80 are a pair of contactors 78 and 79. The contactor 78 ties together the power amplifiers 52 and 54 so as to reproduce the sound of either channel thereof through the respective pair of speakers 20 and 22 while the contactor 79 is connected between the power amplifiers 56 and 58 to reproduce sound from either channel in the pair of speakers 24 and 26.

A multi-positioned switching device 82 has tied together stationary contacts 82*a* and 82*b* connected in series with the contactor 77 of the mode switch 80 and also has stationary contacts 82*c* and 82*d* connected in series with the contactor 76. This arrangement allows a given pair of transducer portions, such as 38*a* and 38*c*, to be operatively activated when the transducer head 38 is in successive alternate position, such as the positions A and B, as illustrated in FIG. 4. Disabling of the transducer portions 38*a* and 38*b* will be effected upon the next successive sequence of movement of the transducer head 38 while the movable contactor of the switch 82 engages the contactors 82*c* and 82*d*, as illustrated by positions C and D in FIG. 4. That is, the rotary switch 82 together with the successive alternate positions of the transducer head 38 caused by the cam 40 combine to simulate movement of a transducer head to four different positions as indicated by the sequence of the four positions A, B, C and D shown by the unshaded rectangles of FIG. 4. This sequence of operation is accomplished only when the cartridge 18 is of the type not having an identification notch, such as the notch 18*a*, and wherein the structural material occupying the space where the notch would be engages an actuating lever 86 of the mode switch 80 to cause connection of the contactors 76 and 77 in series circuit relation with the multi-position switching device 82.

However, should the cartridge 18 be of the type having the notch 18*a*, which herein indicates that a four channel eight track tape is contained therein, the actuating lever 86 will not engage the cartridge but will fit within the space provided by the notch 18*a* and the rotary switch 82, while mechanically being switched from position to position, is electrically ineffective in the circuit and all four channels of sound on the tape 37 will be simultaneously reproduced, as indicated by either position E or F in the FIG. 5 on the tape segment 37.

The movable contactor of the rotary switch 82 is fastened to the extended portion 41 of the cam 40 and rotates therewith in reponse to an actuating device, not shown. The rotary switch 82 selectively disables certain ones of the preamplifiers 44, 46, 48 and 50, preferably by connecting their power supply resistors 67, 68, 69 or 70, respectively, to ground potential when, and only when, the mode switch 80 is actuated and the rotary switch 82 is connected to one of its two groups of stationary contactors. For example, if the movable contact of the switch 82 engages the stationary contacts 82*a* or 82*b* in either of the first two positions of the cam 40, the preamplifiers 46 and 50 are disabled by grounding the power supply resistors 68 and 70 which, in turn, disable the transducer portions 38*b* and 38*d*, this disabling action being illustrated by the shaded rectangular portions illustrated at position A on the tape segment 36 of the FIG. 4. When the cam 40 rotates to the next position, thereby shifting the location of the transducer head 38, the contactor 82 moves from the stationary contact 82*a* to the stationary contact 82*b* so that the same electrical condition exists but only the mechanical position of the transducer head 38 is changed. This will produce a shift in position of the transducer portions 38*a* and 38*c* so that they reproduce the next pair of tracks or channels on the tape 36, this being illustrated by the position B in FIG. 4. With a third indexing of the cam 40 to move the magnetic tape head 38 back to the original level or position, the switch 82 will then also shift to engage the stationary contact 82*c* which effects an electrical change as well as a mechanical change of the transducer portions 38*a*, 38*b*, 38*c* and 38*d*. This electrical change disables the transducer portions 38*a* and 38*c* while enabling the transducer portions 38*b* and 38*d* to reproduce a third pair of channels on the tape as indicated by position C in FIG. 4. The fourth indexing of the cam 40 will cause movement of the transducer head 38 to its next successive position, similar to that mentioned hereinabove for position B, while the switch 82 moves only from stationary contactor 82*c* to the stationary contactor 82*d* thereby maintaining the same electrical connection. This affects movement of the transducer head to reproduce the next successive pair of channels on the tape segment 36 as indicated by the position D in FIG. 4. Therefore, in one mode of operation the present invention uses a combination of cam indexing to physically move the transducer head 38 between successive predetermined alternate positions, and any other multi-positioned switch device, such as a rotary switch, to effect the necessary electrical changes or conditions to simulate the four different positions of a magnetic tape head necessary for reproducing the four programs of stereo music on an eight track tape. When a tape having eight tracks with four channels for each program is used, then the mode switch 80 remains de-actuated and all of the transducer portions 38*a*, 38*b*, 38*c* or 38*d* are operative.

FIGS. 8 and 9 illustrate somewhat detailed fragmentary portions of the tape player 10 showing the apparatus necessary to accomplish the automatic identification of the cartridge 18 as well as to reproduce either two channel sound or four channel sound merely by inserting the cartridge. In FIG. 8 the magnetic head 38 is seen at the rear of the entry way 16 and the switching device 80 is mounted to an upper wall 84. The switching device 80 has the actuating member 86 extending into the entry way to be in alignment with the notch 18*a* of a cartridge 18, of which a fragmentary portion is illustrated and the presence of the notch prevents actuation of the switch 80 to cause four channel operation. However, if a cartridge does not have a notch formed therein, the actuator 86 will be depressed, as seen in FIG. 9 in solid line, to close the contactors 76, 77, 78 and 79 of FIG. 3 and operate the tape player as a two channel, four program, eight track player.

Also seen in the entry way 16 is a contact switching device 88 which has a gap 88*a* formed therein and wherein a conductive portion of a tape, not shown, within the cartridge 18 will bridge the gap automatically to energize an actuating device to shift the position of the magnetic head 38 between its two positions, i.e. to rotate the cam 40 to successive alternate positions. A capstan shaft 89 is also provided at the far end of the entry way 16, as is well known in the art, to engage a drive wheel 90, FIG. 7, located within the cartridge 18, to transport the tape therein past the magnetic pick-up head 38. The head 38 is mounted for substantially vertical movement between its two positions as provided by the respective alternate surfaces 40*a* and 40*b* of the cam 40 by means of linkage which form a pantograph arrangement as provided by a pair of extended levers 91 and 92 connected to a head mounting 93. A bias spring 94 is fastened to the head mounting 93 to cause the cam follower 42 to always ride along the respective cam surfaces 40 *a* and 40*b* upon rotation of the cam 40 to shift the tape head 38 between its two positions. Also extending into the entry way 16 is a lever 96 which provides means for locking the cartridge 18 in position when the cartridge is run all the way into the entry way.

What has been described therefore as an eight track tape player which has the capacity of reproducing either two channel sound or four channel sound automatically upon the insertion of a cartridge having a definite physical identification characteristic which identifies that the tape within the cartridge is either of the two channel, four program, eight track type or of the four channel, two program, eight track type.

I claim:

1. A multi-track tape player system comprising in combination:

magnetic tape head means having four transducer portions formed thereon;

tape transport means for supporting and transporting a multi-track magnetic tape of first or second kinds in operative spaced relation to said magnetic tape head, said multi-track magnetic tape including eight tracks formed thereon, said eight tracks being divided into two programs each containing four channels for said first kind of tape and said eight tracks being divided into four programs each containing two channels for said second kind of tape, with predetermined ones of said tracks on the tape in registry with said transducer portions;

actuating means including a cam operable at the end of a program for moving said magnetic tape head means in a direction transverse to the direction of tape travel to shift said magnetic tape head means alternately between only first and second positions, switch means including first contact means rotatably connected to said cam and second contact means fixed in a spaced relation to said first contact means, said second contact means having a first circuit portion for connection in circuit with said transducer portions of said magnetic tape head to render only a selected two of said four transducer portions active, said second contact means further having a second circuit portion for connection in circuit with said transducer portions of said magnetic tape head to render the other two of said four transducer portions active; said first contact means engaging said second contact means with the rotation of said cam for selectively connecting said first and second circuit portions thereof to a reference potential through said cam; and mode switch means having first and second positions for controlling the activation of said four transducer portions of said magnetic tape head, said mode switch means in said first position activates all four transducer portions of said tape head in both said first and second positions of said cam while playing said first kind of tape, and said mode switch means in said second position connecting said switch means in circuit with said four transducer portions of said tape head whereby two successive first and second positions of said cam connects said first circuit portion of said switch means in circuit with said transducer portions of said magnetic tape head and the reference potential through said first contact means and said cam to render two of said four transducer portions active, and another two successive first and second positions of said cam connects said second circuit portion of said switch means in circuit with said transducer portions of said magnetic tape head and the reference potential through said first contact means and said cam to render the other two of said four transducer portions active thereby playing said second kind of tape.

2. The multi-track player system of claim 1 wherein said tape transport means includes a cartridge for insertion into the tape player, said cartridge having identification means formed thereon in accordance with the tape characteristic housed within the cartridge, said mode switch means being positioned to either said first or second positions in response to the identification means on the cartridge.

3. The multi-track player system of claim 1 further including in combination, a preamplifier circuit for each of the magnetic transducer portions, each of said preamplifier circuits having an input connected to said transducer portion and an output, a power amplifier having an input connected to the output of a corresponding preamplifier, and an output of said power amplifier connected to corresponding independent speaker means, each of said first and second circuit portions of said second contact means being connected to different pairs of said preamplifier circuits.

* * * * *